(12) United States Patent  (10) Patent No.: US 7,437,330 B1
Robinson et al.  (45) Date of Patent: Oct. 14, 2008

(54) SYSTEM AND METHOD FOR CATEGORIZING TRANSACTIONS

(75) Inventors: Timothy L. Robinson, Reston, VA (US); Bradford R. Schildt, Boulder, CO (US); Tennille V. Goff, Springfield, VA (US); Daniel J. Corwin, Ashburn, VA (US); Timothy Neil Watson, Alexandria, VA (US)

(73) Assignee: YT Acquisition Corp., Delray Beach, FL (US)

( * ) Notice: Subject to any disclaimer, the term of this patent is extended or adjusted under 35 U.S.C. 154(b) by 108 days.

(21) Appl. No.: 11/076,892

(22) Filed: Mar. 11, 2005

Related U.S. Application Data

(63) Continuation-in-part of application No. 10/829,448, filed on Apr. 22, 2004, now Pat. No. 7,082,415, which is a continuation-in-part of application No. 10/251,305, filed on Sep. 20, 2002, now Pat. No. 7,269,737.

(51) Int. Cl.
*G06F 17/60* (2006.01)

(52) U.S. Cl. .................................. 705/67; 713/186
(58) Field of Classification Search .............. 705/67; 713/186
See application file for complete search history.

(56) References Cited

U.S. PATENT DOCUMENTS

| 4,230,214 A | 10/1980 | Cortez |
| 4,359,631 A | 11/1982 | Lockwood et al. |
| 4,553,222 A | 11/1985 | Kurland et al. |
| 4,716,593 A | 12/1987 | Hirai et al. |
| 4,879,747 A | 11/1989 | Leighton et al. |
| 4,915,205 A | 4/1990 | Reid et al. |
| 4,995,081 A | 2/1991 | Leighton et al. |
| 5,042,073 A | 8/1991 | Collot et al. |
| 5,086,389 A | 2/1992 | Hassett et al. |
| 5,144,553 A | 9/1992 | Hassett et al. |
| 5,274,695 A | 12/1993 | Green |
| 5,280,527 A | 1/1994 | Gullman et al. |
| 5,289,183 A | 2/1994 | Hassett et al. |
| 5,335,288 A | 8/1994 | Faulkner |
| 5,351,187 A | 9/1994 | Hassett |
| 5,352,876 A | 10/1994 | Watanabe et al. |
| 5,386,104 A | 1/1995 | Sime |
| 5,412,738 A | 5/1995 | Brunelli et al. |
| 5,450,980 A | 9/1995 | Laidlaw |
| 5,453,601 A | 9/1995 | Rosen |

(Continued)

FOREIGN PATENT DOCUMENTS

| EP | 0598469 A2 | 5/1994 |
| EP | 0762261 A2 | 3/1997 |
| JP | 358044583 A | 3/1983 |
| JP | 2006285442 A * | 10/2006 |

OTHER PUBLICATIONS

IBM Technical Disclosure Bulletin, Title: selective receipt of document elements in an electronic mail system, Issue No. 429, TDB-ACC-No. NNRD429177, Jan. 2000, UK.

(Continued)

*Primary Examiner*—Pierre E Elisca
(74) *Attorney, Agent, or Firm*—Pepper Hamilton LLP

(57) ABSTRACT

A system and method of allowing individuals to categorize transaction information. A user of the system may establish transaction identifiers that may be employed during or subsequent to a transaction in order to categorize transaction information.

4 Claims, 4 Drawing Sheets

U.S. PATENT DOCUMENTS

| | | | |
|---|---|---|---|
| 5,455,407 A | 10/1995 | Rosen |
| 5,483,601 A | 1/1996 | Faulkner |
| 5,485,510 A | 1/1996 | Colbert |
| 5,523,551 A | 6/1996 | Scott |
| 5,546,523 A | 8/1996 | Gatto |
| 5,581,630 A | 12/1996 | Bonneau, Jr. |
| 5,594,806 A | 1/1997 | Colbert |
| 5,598,474 A | 1/1997 | Johnson |
| 5,602,933 A | 2/1997 | Blackwell et al. |
| 5,613,012 A | 3/1997 | Hoffman et al. |
| 5,615,217 A | 3/1997 | Horne et al. |
| 5,615,277 A | 3/1997 | Hoffman |
| 5,657,389 A | 8/1997 | Houvener |
| 5,679,938 A | 10/1997 | Templeton et al. |
| 5,688,974 A | 11/1997 | Devine et al. |
| 5,696,739 A | 12/1997 | Chang |
| 5,719,950 A | 2/1998 | Osten et al. |
| 5,722,526 A | 3/1998 | Sharrard |
| 5,737,439 A | 4/1998 | Lapsley et al. |
| 5,745,598 A | 4/1998 | Shaw et al. |
| 5,751,973 A | 5/1998 | Hassett |
| 5,764,789 A | 6/1998 | Pare, Jr. et al. |
| 5,790,674 A | 8/1998 | Houvener et al. |
| 5,790,785 A | 8/1998 | Klug et al. |
| 5,799,092 A | 8/1998 | Kristol et al. |
| 5,802,199 A | 9/1998 | Pare, Jr. et al. |
| 5,805,082 A | 9/1998 | Hassett |
| 5,805,719 A | 9/1998 | Pare, Jr. et al. |
| 5,832,464 A | 11/1998 | Houvener et al. |
| 5,838,812 A | 11/1998 | Pare, Jr. et al. |
| 5,845,256 A | 12/1998 | Pescitelli et al. |
| 5,850,442 A | 12/1998 | Muftic |
| 5,857,079 A | 1/1999 | Claus et al. |
| 5,864,623 A | 1/1999 | Messina et al. |
| 5,870,723 A | 2/1999 | Pare, Jr. et al. |
| 5,872,834 A | 2/1999 | Teitelbaum |
| 5,893,075 A | 4/1999 | Plainfield et al. |
| 5,897,616 A | 4/1999 | Kanevsky et al. |
| 5,914,472 A | 6/1999 | Foladare et al. |
| 5,927,544 A | 7/1999 | Kanoh et al. |
| 5,930,804 A | 7/1999 | Yu et al. |
| 5,933,816 A | 8/1999 | Zeanah et al. |
| 5,943,423 A | 8/1999 | Muftic |
| 5,982,914 A | 11/1999 | Lee et al. |
| 5,984,366 A | 11/1999 | Priddy |
| 6,009,411 A | 12/1999 | Kepecs |
| 6,012,039 A | 1/2000 | Hoffman et al. |
| 6,028,950 A | 2/2000 | Merjanian |
| 6,040,783 A | 3/2000 | Houvener et al. |
| D425,800 S | 5/2000 | Shin |
| 6,061,660 A | 5/2000 | Eggleston et al. |
| 6,070,141 A | 5/2000 | Houvener et al. |
| 6,070,147 A | 5/2000 | Harms et al. |
| 6,092,192 A | 7/2000 | Kanevsky et al. |
| 6,094,632 A | 7/2000 | Hattori |
| 6,105,010 A | 8/2000 | Musgrave |
| 6,119,932 A | 9/2000 | Maloney et al. |
| 6,148,091 A | 11/2000 | DiMaria |
| 6,149,055 A | 11/2000 | Gatto |
| 6,154,879 A | 11/2000 | Pare, Jr. et al. |
| 6,157,314 A | 12/2000 | Loftus |
| 6,160,903 A | 12/2000 | Hamid et al. |
| 6,161,059 A | 12/2000 | Tedesco et al. |
| 6,161,090 A | 12/2000 | Kanevsky et al. |
| 6,175,922 B1 | 1/2001 | Wang |
| 6,181,807 B1 | 1/2001 | Setlak et al. |
| 6,192,142 B1 | 2/2001 | Pare, Jr. et al. |
| 6,196,460 B1 | 3/2001 | Shin |
| 6,222,914 B1 | 4/2001 | McMullin |
| 6,230,148 B1 | 5/2001 | Pare et al. |
| 6,233,564 B1 | 5/2001 | Schulze, Jr. |
| 6,246,751 B1 | 6/2001 | Bergl et al. |
| 6,269,348 B1 | 7/2001 | Pare, Jr. et al. |
| 6,282,658 B2 | 8/2001 | French et al. |
| 6,307,955 B1 | 10/2001 | Zank et al. |
| 6,307,956 B1 | 10/2001 | Black |
| 6,310,966 B1 | 10/2001 | Dulude et al. |
| 6,314,169 B1 | 11/2001 | Schelberg, Jr. et al. |
| 6,317,723 B1 | 11/2001 | Walker et al. |
| 6,317,834 B1 | 11/2001 | Gennaro et al. |
| 6,321,339 B1 | 11/2001 | French et al. |
| 6,327,573 B1 | 12/2001 | Walker et al. |
| 6,330,543 B1 | 12/2001 | Kepecs |
| 6,332,134 B1 | 12/2001 | Foster |
| 6,334,109 B1 | 12/2001 | Kanevsky et al. |
| 6,334,112 B1 | 12/2001 | Walker et al. |
| 6,334,113 B1 | 12/2001 | Walker et al. |
| 6,341,169 B1 | 1/2002 | Cadorette, Jr. et al. |
| 6,345,263 B1 | 2/2002 | Matsumoto et al. |
| 6,363,485 B1 | 3/2002 | Adams et al. |
| 6,366,682 B1 | 4/2002 | Hoffman et al. |
| 6,370,649 B1 | 4/2002 | Angelo et al. |
| 6,381,344 B1 | 4/2002 | Smithies et al. |
| 6,389,401 B1 | 5/2002 | Kepecs |
| 6,397,126 B1 | 5/2002 | Nelson |
| 6,397,198 B1 | 5/2002 | Hoffman et al. |
| 6,405,125 B1 | 6/2002 | Ayed |
| 6,415,262 B1 | 7/2002 | Walker et al. |
| 6,422,464 B1 | 7/2002 | Terranova |
| 6,424,249 B1 | 7/2002 | Houvener |
| 6,433,818 B1 | 8/2002 | Steinberg et al. |
| 6,446,044 B1 | 9/2002 | Luth et al. |
| 6,463,127 B1 | 10/2002 | Maier et al. |
| 6,466,917 B1 | 10/2002 | Goyal et al. |
| 6,470,233 B1 | 10/2002 | Johnson, Jr. |
| 6,470,322 B1 | 10/2002 | Walker et al. |
| 6,477,509 B1 | 11/2002 | Hammons et al. |
| 6,496,595 B1 | 12/2002 | Pucheck et al. |
| 6,497,360 B1 | 12/2002 | Schulze |
| 6,498,970 B2 | 12/2002 | Colmenarez et al. |
| 6,507,912 B1 | 1/2003 | Matyas et al. |
| 6,522,772 B1 | 2/2003 | Morrison et al. |
| 6,523,741 B1 | 2/2003 | DiMaria et al. |
| 6,529,871 B1 | 3/2003 | Kanevsky et al. |
| 6,529,878 B2 | 3/2003 | De Rafael et al. |
| 6,532,459 B1 | 3/2003 | Berson |
| 6,539,282 B2 | 3/2003 | Metcalf et al. |
| 6,542,874 B1 | 4/2003 | Walker et al. |
| 6,554,705 B1 | 4/2003 | Cumbers |
| 6,559,776 B2 | 5/2003 | Katz |
| 6,567,787 B1 | 5/2003 | Walker et al. |
| 6,581,042 B2 | 6/2003 | Pare et al. |
| 6,591,224 B1 | 7/2003 | Sullivan et al. |
| 6,594,376 B2 | 7/2003 | Hoffman et al. |
| 6,636,973 B1 | 10/2003 | Novoa et al. |
| 6,646,568 B2 | 11/2003 | MacPhail et al. |
| 6,647,372 B1 | 11/2003 | Brady et al. |
| 6,650,999 B1 | 11/2003 | Brust et al. |
| 6,651,063 B1 | 11/2003 | Vorobiev |
| 6,653,946 B1 | 11/2003 | Hassett |
| 6,655,585 B2 | 12/2003 | Shinn |
| 6,662,166 B2 | 12/2003 | Pare et al. |
| 6,685,088 B1 | 2/2004 | Royer et al. |
| 6,694,300 B1 | 2/2004 | Walker et al. |
| 6,695,206 B2 | 2/2004 | Ross |
| 6,715,673 B2 | 4/2004 | Fulcher et al. |
| 6,715,674 B2 | 4/2004 | Schneider et al. |
| 6,748,365 B1 | 6/2004 | Quinlan et al. |
| 6,755,344 B1 | 6/2004 | Mollett et al. |
| 6,792,334 B2 | 9/2004 | Metcalf et al. |
| 6,792,422 B1 | 9/2004 | Stride et al. |
| 6,796,492 B1 | 9/2004 | Gatto |
| 6,796,499 B1 | 9/2004 | Wang |
| 6,827,260 B2 | 12/2004 | Stoutenburg et al. |

| | | |
|---|---|---|
| 6,854,642 B2 | 2/2005 | Metcalf et al. |
| 6,865,544 B1 | 3/2005 | Austin |
| 6,873,969 B2 | 3/2005 | Stone et al. |
| 6,886,742 B2 | 5/2005 | Stoutenburg et al. |
| 6,935,559 B2 | 8/2005 | Mollett et al. |
| 2001/0000535 A1 | 4/2001 | Lapsley et al. |
| 2001/0011680 A1 | 8/2001 | Soltesz et al. |
| 2001/0025245 A1 | 9/2001 | Flickinger et al. |
| 2001/0034609 A1 | 10/2001 | Dovolis |
| 2001/0042022 A1 | 11/2001 | Kirkpatrick et al. |
| 2001/0047223 A1 | 11/2001 | Metcalf et al. |
| 2001/0047343 A1 | 11/2001 | Dahan et al. |
| 2002/0016913 A1* | 2/2002 | Wheeler et al. ............. 713/170 |
| 2002/0019811 A1 | 2/2002 | Lapsley et al. |
| 2002/0029196 A1 | 3/2002 | Metcalf et al. |
| 2002/0038165 A1 | 3/2002 | McHale, IV et al. |
| 2002/0046121 A1 | 4/2002 | Walker et al. |
| 2002/0062249 A1 | 5/2002 | Iannacci |
| 2002/0077889 A1 | 6/2002 | Kolls |
| 2002/0077890 A1 | 6/2002 | LaPointe et al. |
| 2002/0077902 A1 | 6/2002 | Marcus |
| 2002/0087413 A1 | 7/2002 | Mahaffy et al. |
| 2002/0091537 A1 | 7/2002 | Algazi |
| 2002/0094111 A1 | 7/2002 | Pucheck et al. |
| 2002/0111917 A1 | 8/2002 | Hoffman et al. |
| 2002/0112177 A1 | 8/2002 | Voltmer et al. |
| 2002/0116266 A1 | 8/2002 | Marshall |
| 2002/0128851 A1 | 9/2002 | Chefalas et al. |
| 2002/0148892 A1 | 10/2002 | Bardwell |
| 2002/0153414 A1 | 10/2002 | Stoutenburg et al. |
| 2002/0161629 A1 | 10/2002 | Jentoft |
| 2002/0162031 A1 | 10/2002 | Levin et al. |
| 2002/0173986 A1 | 11/2002 | Lehew et al. |
| 2002/0178063 A1 | 11/2002 | Gravelle et al. |
| 2002/0194128 A1 | 12/2002 | Maritzen et al. |
| 2002/0196963 A1 | 12/2002 | Bardwell |
| 2003/0006277 A1 | 1/2003 | Maskatiya et al. |
| 2003/0009382 A1 | 1/2003 | D'Arbeloff et al. |
| 2003/0009393 A1 | 1/2003 | Norris |
| 2003/0018522 A1 | 1/2003 | Denimarck et al. |
| 2003/0018567 A1 | 1/2003 | Flitcroft et al. |
| 2003/0034876 A1 | 2/2003 | Pucheck et al. |
| 2003/0046228 A1 | 3/2003 | Berney |
| 2003/0055727 A1 | 3/2003 | Walker et al. |
| 2003/0067396 A1 | 4/2003 | Hassett |
| 2003/0075287 A1 | 4/2003 | Weik |
| 2003/0076417 A1 | 4/2003 | Thomas et al. |
| 2003/0090473 A1 | 5/2003 | Joshi |
| 2003/0105725 A1 | 6/2003 | Hoffman |
| 2003/0144956 A1 | 7/2003 | Yu et al. |
| 2003/0150907 A1 | 8/2003 | Metcalf et al. |
| 2003/0183689 A1 | 10/2003 | Swift et al. |
| 2003/0187790 A1 | 10/2003 | Swift et al. |
| 2003/0187796 A1 | 10/2003 | Swift et al. |
| 2003/0191709 A1 | 10/2003 | Elston et al. |
| 2003/0209599 A1 | 11/2003 | Gatto |
| 2003/0216967 A1 | 11/2003 | Williams |
| 2003/0216987 A1 | 11/2003 | Mollett et al. |
| 2003/0222135 A1 | 12/2003 | Stoutenburg et al. |
| 2003/0229539 A1 | 12/2003 | Algiene |
| 2003/0229540 A1 | 12/2003 | Algiene |
| 2003/0229790 A1 | 12/2003 | Russell |
| 2003/0236704 A1 | 12/2003 | Antonucci |
| 2004/0012481 A1 | 1/2004 | Brusseaux |
| 2004/0020982 A1 | 2/2004 | Hoffman et al. |
| 2004/0024672 A1 | 2/2004 | Brack et al. |
| 2004/0039632 A1 | 2/2004 | Han et al. |
| 2004/0054587 A1 | 3/2004 | Dev et al. |
| 2004/0083172 A1 | 4/2004 | Wiederin |
| 2004/0088232 A1 | 5/2004 | Minnis, Jr. |
| 2004/0088295 A1 | 5/2004 | Glazer et al. |
| 2004/0143505 A1 | 7/2004 | Kovach |
| 2004/0155101 A1 | 8/2004 | Royer et al. |
| 2004/0158524 A1 | 8/2004 | Anderson et al. |
| 2004/0192434 A1 | 9/2004 | Walker et al. |
| 2004/0201520 A1 | 10/2004 | Flick |
| 2004/0215565 A1 | 10/2004 | Huffman |
| 2004/0254840 A1 | 12/2004 | Slemmer et al. |
| 2005/0010478 A1 | 1/2005 | Gravelle |
| 2005/0055582 A1 | 3/2005 | Bazakos et al. |
| 2005/0144133 A1 | 6/2005 | Hoffman et al. |

OTHER PUBLICATIONS

Video Insight. http://www.video-insight.com/dvr221.htm.

TMCnet. CErnium Installs Perceptrak Behavrior Recognition Software In Public Parking Garage In Yonkers. http://www.tmcnet.com/usubmit/2003/Dec/1021669.htm. Dec. 2003.

City of Aspen. Parking. http://www.aspenpitkin.com/depts/61/payanddisplay.cfm.

SmartCity. SmartCity Card Solutions. http://www.coinamatic.com/coinamatic_group/html/apartment_laundry_services/smartcity/Products/p4.html.

TranCore. TransCore Access Control System First to Successfully Combine Biometrics and RFID. http://www.transcore.com/news/news050314.htm. Mar. 2005.

James P. Holmes et al. A Performance Evaluation of Biometric Identification Devices. Sandia Report. Jun. 1991.

S. Davies. Touching Big Brother. How Biometric Technology Will Fuse Flesh and Machine. Information Technology & People. vol. 7 (4) 1994.

Lawrence Aragon. Show me some ID. PC Week Online (http://www.zdnet.com/pcweek/0112/12bio.html) Jan. 1998.

Gerald Lazar. Agencies Scan Biometrics for Potential Applications. FCW.com (http://www.fcw.com.pubs.few.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http:/www.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty.jhicks/acct5544/present/ddeverea.htm. Apr. 1997.

Vault FAQs. http://www.ImagineNation.com/Xanadu/Vault. Jun. 1997.

John Daugman. The Scientific Basis for Iris Recognition. Http://www.iriscan.com/basis.htm. Dec. 1998.

Electronic Banking 1. http://www.sjb.co.uk/eb1.html. Aug. 1998.

Biometric Technology Today (Btt). vol. 6(5) Sep. 1998.

Biometric Digest. Mar. 1998.

Biometrics in Human Services. vol. 2(1) Feb. 1998.

"The Biometric Bar Tab Project." http://www.csee.wvu.edu/~wise/biometric/index.htm, including Dec. 9, 2002 Proposal, and May 5, 2003 Team Report.

Office of NYS Attorney General Eliot Spitzer. Financial Giant Joins Fight Against Online Gambling. Press Release. http://www.oag.state.ny.us/press/2002/jun/jun14a_02.html. Jun. 2002.

Zions Bank. Cards for Any Business Occasion. http://www.zionsbank.com/bank_cards.jsp?leftNav=bf_bfinance &topNav=bfinance.

ABSA. Purchasing Credit Card. http://www.absa.co.za/Corporate/0,2999,2210,00.html.

Visa U.S.A. Visa Purchasing. http://www.usa.visa.com/corporate/corporate_solutions/payment/visa_purchasing.html?it=cl/corporate/corporate_solutions/index%2Ehtml|Visa%20Purchasing%20.

University of Wisconsin-Green Bay. Purchasing Department: Purchasing Card. http://www.uwgb.edu/Purchasing/purchasingCard/procurement07.htm.

Reference Guides Glossary Terms (Online Glossary Terms and Definitions). Merchant Glossary: Merchant Category Code (MCC) (Merchant Category Code) (MCC) Help). http://glossary.reference-guides.com/Merchant/Merchant_Category_Code_MCC/. 2003.

University of Denver. Purchasing Card User Guide. http://www.du.edu/purchasing/purcard.html#2.%20HOW%20DOES%20THE-%20CARD%20WORK?.

Williams College Controller's Office. Purchasing Card Procedures. http://www.williams.edu/admin/controller/pcard.html#whatis. Jan. 2005.

Arizona State University. The Purchasing Card: A Guide for Users. http://www.asu.edu/purchasing/pdf/purchcard.pdf. Jan. 2005.

Washington Post—For Dining In, Security Is the Order of the Day; Post 9/11 Concerns Thwarting Deliverymen: [Final Edition], 2004.

MophoTouch™—Multi-Application Finger Identification in the Palm of Your Hand, Sagem Morpho, Inc., 1999.

* cited by examiner

SYSTEM AND METHOD FOR CATEGORIZING TRANSACTIONS

This application is a continuation-in-part of application Ser. No. 10/829,448, filed Apr. 22, 2004, now U.S. Pat. No. 7,082,415 which is a continuation-in-part of application Ser. No. 10/251,305, filed Sep. 20, 2002, now U.S. Pat. No. 7,269,737 which claims domestic priority from provisional application No. 60/324,229, filed Sep. 21, 2001. Each above-identified application is incorporated by reference herein, in its entirety, for all purposes.

FIELD OF THE INVENTION

This application relates generally to a system and method for categorizing transactions. More particularly, the present invention relates to a system and method for categorizing transactions via one or more transaction identifiers.

BACKGROUND OF THE INVENTION

Generally, the process of categorizing transactions for financial reporting is a tedious process. Transaction tracking is important to individuals who maintain records for accounting purposes, but they may have difficulty remembering the circumstances of each transaction. To overcome this, some make note of a transaction's category, such as business or personal, after the transaction. The individual may mark sales receipts with this information, store these receipts, and later sort through them when logging transactions. The process of reviewing receipts can be time consuming and receipts are typically small slips of paper that may be easily lost. An individual may seek to surmount such problems by employing separate financial accounts for various transaction categories. For example, one might have a credit card for business and another for personal use. However, this method can also be troublesome, because individuals must ensure that they have the appropriate financial token with them at the time of the transaction. If they do not, they may be forced to employ another method. Furthermore, an individual may mistakenly employ an incorrect financial token, such as utilizing a business credit card for a personal purchase. What is needed is a more efficient system and method for categorizing transactions.

SUMMARY OF THE INVENTION

The present invention addresses the aforementioned needs by providing individuals with a convenient system and method for categorizing transactions. A user of the system may establish transaction identifiers that may be employed during or subsequent to a transaction in order to categorize transaction information.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
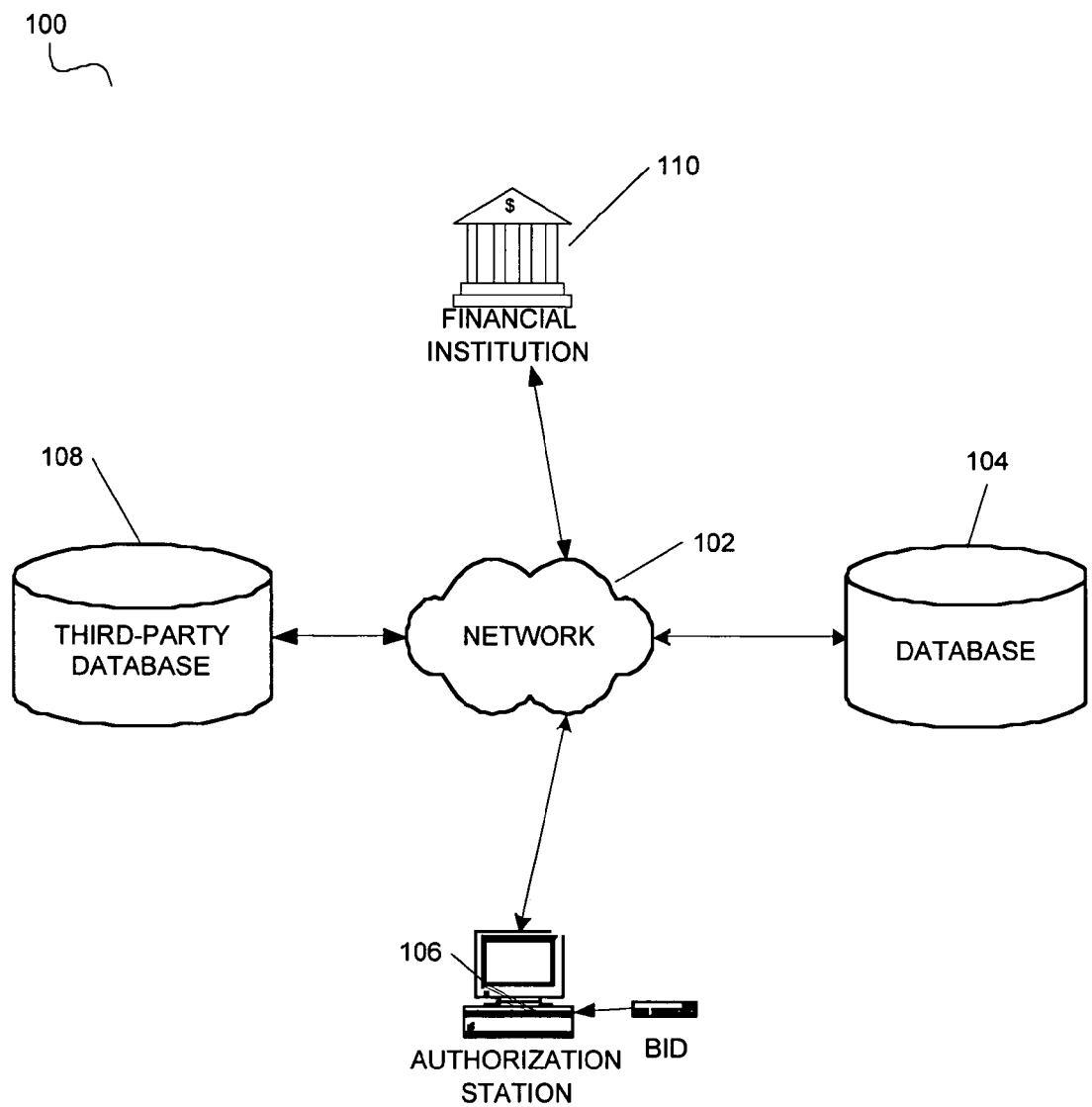
FIG. 1 illustrates a general architecture overview of a transaction categorization system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention overcomes the problems of transaction tracking by providing a system and method for categorizing transaction information with one or more transaction identifiers. Typically, a person seeking to categorize a transaction must perform various steps to maintain an accurate record of transaction data. For example, a person may keep careful account of receipts and note which transaction category (e.g., business, personal, etc.) pertains to a particular transaction. As sales receipts are typically small, they may be easily lost, and the process of reviewing such receipts and logging various transactions can be a tedious and time-consuming process.

To solve such problems, an individual may employ different financial accounts for various transaction categories. For example, a person may use one checking account for business and another for personal. However, such a method requires a user manage multiple tokens, such as checks, credit cards, debit cards, and the like. Additionally, an individual must be particularly vigilant about which token he employs to ensure accurate transaction tracking. A person, perhaps distracted at the time of a transaction, may employ the wrong token, inadvertently logging a personal transaction as a business transaction or vice versa. If the individual does not have the appropriate token at the time of the transaction, he may be forced to employ another payment method. Moreover, an individual that prefers to pay by cash may not use such a method to track transactions.

Further issues may arise if a financial account is employed by multiple individuals. For example, a business may have a company financial account accessible by multiple employees. The accounting department may have difficulty determining which employee made a particular purchase. This may be particularly important if the accounting department is attempting to ascertain which employee made an unauthorized purchase or withdrawal.

The biometric authorization system (BAS) described herein overcomes the aforementioned problems by allowing a user to categorize transactions with a transaction identifier. In one embodiment, a transaction identifier may be biometric data that designates a transaction category and/or the person conducting the transaction.

A user may register a particular transaction identifier for a certain transaction category. For example, a user may elect to employ his right index finger to categorize transactions as business and his left index finger to categorize transactions as personal. Transaction identifier registration may occur at a variety of times as would be dictated by a particular system implementation. Depending on the embodiment, BAS enrollment and transaction identifier registration may occur prior to, during, or subsequent to a transaction. The use of transaction identifiers alleviates the need for maintaining a "paper trail" of sales receipts and eliminates the laborious process of sorting such receipts for accurate accounting.

Additionally, the present invention allows a user to categorize and record transaction information regardless of the transaction method employed. Although a user may associate a transaction identifier with a particular financial account, this is not a necessity. Because a transaction identifier may be associated with a particular transaction category rather than a financial account, the user may utilize a variety of transaction methods and still maintain an accurate record. Likewise, a user may employ one payment method for a variety of transaction categories. For example, a user may employ a single credit card account for all purchases by entering the appropriate transaction identifier to classify purchases. In regards to a credit card account with a rewards system, a user might find this feature particularly useful as he can earn reward points regardless of the category of transaction.

In an alternate embodiment, a transaction category may pertain to a particular user rather than, or in addition to, a transaction type. Such a system allows multiple users to employ one account but to record their transactions separately. For example, a husband and wife may have a joint checking account. By employing transaction identifiers, the husband and wife may track their expenses separately. In a business scenario, the BAS may allow an accounting department to monitor the expenses of employees with access to a communal business account or assist with expense reimbursement.

Users may utilize the system once they have registered one or more transaction identifiers. In this registration process, the system identifies the user and obtains one or more transaction identifiers from the user. These registered transaction identifiers would subsequently be used to categorize transactions per the transaction identifier, with the categorized transaction information being recorded in a user record. In one scenario, categorization occurs as a transaction transpires. In another scenario, categorization occurs subsequent to the transaction.

Once transaction information has been categorized, users may manipulate the data for numerous purposes. For example, a user may access transaction information via a personal computer connected to the Internet to create expense reports. Users may configure the system to generate these reports automatically or users may create the reports as they see fit. These reports may be printed, saved, and/or transferred electronically, allowing users to create accurate documents useful for accounting purposes.

As aforementioned, a transaction identifier may be user biometric data. User biometric data may be received by the BAS from a variety of sources. For example, during transaction identifier registration, the BAS may receive a user's biometric data from a third-party database networked to the system. During a transaction, the BAS may receive a user's biometric data from a biometric token presented at the point of sale. If a token is used to provide biometric data, it may not have a financial function. For example, as user may employ a biometric token to enter a transaction identifier and provide a separate token, such as a credit card, for payment. Biometric data may be used to authorize the user biometrically for identification purposes.

In general, a biometric authorization refers to an authorization in which either a user, an operator, such as a merchant or employer, or an agent, such as an employee of the BAS, provides biometric data to be matched against a biometric record in a database. As would be appreciated, the location of the database as well as the specific mechanism by which the biometric data is matched to a particular biometric record would be implementation dependent and would not limit the scope of the present invention. Thus, in a biometric authorization, the biometric data taken during the authorization can be matched against registered biometric data at a location where the registered biometric data is stored or where the authorization biometric data is gathered. In addition, biometric data received during an authorization may be tested for liveness to prevent system fraud.

Depending on the embodiment, the BAS may also provide a registered user with a user identifier, such as a system identification number (SID). A user identifier may serve as a pointer that can be used with or without a transaction identifier to aid the system in locating a user record. Additionally, an SID may assist a user in accessing his user record when a BID is not available or necessary. For example, a user wishing to access his user record via a BAS website may provide his SID and a pass code to gain access. Depending on the embodiment of the system, a user identifier may also serve as a user group identifier that identifies a user as an affiliate of a specified group of users. In one embodiment, a user identifier may also serve as a transaction identifier. For example, a user identifier may assist in locating the user record and also provide categorization information for the associated transaction.

Additionally, the principles of the present invention are not limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template may be a mathematical representation of more than one biometric. For example, a user template may be generated from biometric data acquired from two individual fingers, such as a thumb and index finger, or from a finger and an iris scan. The biometric data may include fingerprint data, iris data, facial data, voice data, retinal data, hand architecture data, DNA data, or any other physical measurement pertaining to a user's person.

FIG. 1 illustrates a general architecture overview of BAS 100. As will be described in detail below, BAS 100 enables categorization of transaction information via transaction identifiers, such as biometric data. User information is stored in user records at database 104. Database 104 may represent one or more databases utilized within the system. In one embodiment, database 104 is a central database to which all user records are stored and from which user records are accessed for transaction categorization. In another embodiment, database 104 also includes one or more operator databases to which a select set of operator records are stored and from which a select set of operator records are accessed for transaction categorization. For example, merchants may utilize BAS 100 to determine if their locations attract users seeking business or personal services.

In an additional embodiment, BAS 100 may also utilize a combination of central databases and one or more operator databases. In general, embodiments utilizing a combination of databases enable increased control of information flow throughout BAS 100. As described in detail below, various examples of information flow configurations within the system can include "open," "closed," and "selectively shared" system models. In still further embodiments, database 104 can further comprise one or more sub-databases that are contained within a particular database. In such embodiments, user data, operator data, and other system data may be distributed across multiple databases within database 104.

A user record holds user information, such as transaction identifier data, biometric data, and other identity verifying information related to an individual seeking to categorize transaction information. The information held in such a record may include, by way of illustration and without limitation, a user's government identification number(s) and corresponding state(s) of issue, home address, email address, a telephone number, and a biometric record. When enrolling in BAS 100, a user may present any number of identity verifying documents or testaments to his identity depending on the implementation of the system. By way of illustration and not of limitation, examples of such documents or testaments include a financial token, a digital image, a video clip, family information, or a DNA sample. Typically, a user enrolls in BAS 100 by providing user information at an authorization station (AS) 106. Depending on the particular implementation, a user record can also hold financial account information and/or a user identifier, such as an SID. Enrollment may occur at a variety of times, such as prior to a transaction, during a transaction, or subsequent to a transaction. User enrollment and transaction identifier registration may occur simultaneously or separately. For example, a user may enroll in BAS 100 prior to a transaction, and register a transaction identifier during or after a transaction.

An operator record holds information useful for authenticating an operator, such as a name or ID number, device ID numbers associated with the operator, an address, and a phone number. In one embodiment, operator records hold an operator identifier, such as an SID and/or operator biometric data. In one scenario, an operator may need to undergo biometric authorization before conducting administrative activities.

In addition to users and operators, agents of BAS 100 may have access to BAS functions and/or records. An agent may be an employee of BAS 100 capable of monitoring and assisting with operation of BAS 100 functions. For example, an agent may access user records in order to verify user and operator registration data or administer BAS 100 maintenance procedures.

Database 104 and third-party database 108 are connected to network 102, which may be, but is not limited to, the Internet. Networks used in additional embodiments include local area networks (LANs), wide area networks (WANs), and telephone networks. Network 102 comprises connections to at least one AS 106 where a user may provide a transaction identifier. AS 106 typically includes at least one biometric input device (BID) and the necessary means for sending and receiving information to and from a user and to and from a database. An AS BID may be a peripheral device or an integrated BID. In one embodiment, AS 106 may simply be a BID connected to BAS 100. Possible embodiments of AS 106 include but are not limited to a vending machine, a kiosk, a personal computer, a user service desk, a point of sale terminal, a telephone, or a wireless device connected via a wireless network.

Additional embodiments of the system also comprise connections to one or more third-party sources, such as third-party database 108, in which user information (e.g., user biometric data) is verified and/or from which user information is retrieved. Depending upon the embodiment, BAS 100 may assist with the financial payment process. The system may be connected to one or more financial sources, such as financial institution 110, in order to facilitate financial transactions. For example, a user record stored at database 104 may indicate an account held at financial institution 110 that is to be debited during a categorization transaction.

Information transferred in the system may be encrypted. For example, information may be encrypted at one point and sent across a non-secure connection between points or not encrypted at a point of communication and sent to the other point of communication across a secure connection. Encryption and decryption of these messages may be monitored by services provided by a security company such as VeriSign. In one scenario, as an added level of security, information internal to a terminal and which is never transmitted may also be encrypted. This prevents retrieval of sensitive information (e.g., biometric data) from a stolen terminal. In an additional embodiment, the system incorporates one or more anti-tampering methods by which to recognize authentic and non-authentic system requests.

BAS 100 may function in a variety of configurations, including, but not limited to, an "open," "closed," or "selectively shared system." An open system allows for categorization via any AS 106 in the system because the system shares user information stored in database 104 with any AS 106 or database associated with the system. Alternatively, the system may be configured as a closed system, in which information entered into the system via a specific operator-associated AS 106 is transmitted to and stored in database 104 specific to that operator, and this information is not shared with another operator's AS 106 or database. In an alternate embodiment, information is stored in a partitioned database 104, in which operator-related information is stored in operator-specific partitions and is closed to all other operators. Only an authorized operator and authorized entities, such as agents, may access that partition of database 104. Furthermore, BAS 100 may be configured as a selectively shared system. This configuration allows a chain of operators owned by the same entity or linked in some other manner to share user information without sharing that data with all other non-designated operators registered in the system.

Although an open system provides for maximum functionality, operators may desire to implement a closed or selectively shared system for various reasons. For example, a chain of operators may use BAS 100 to encourage users to shop at their stores instead of a competitor because the transaction categorization capabilities of BAS 100 ease accounting issues. Alternatively, an operator may employ a closed system to track employee expenses, such as in a fleet billing scenario.

Figure 2:
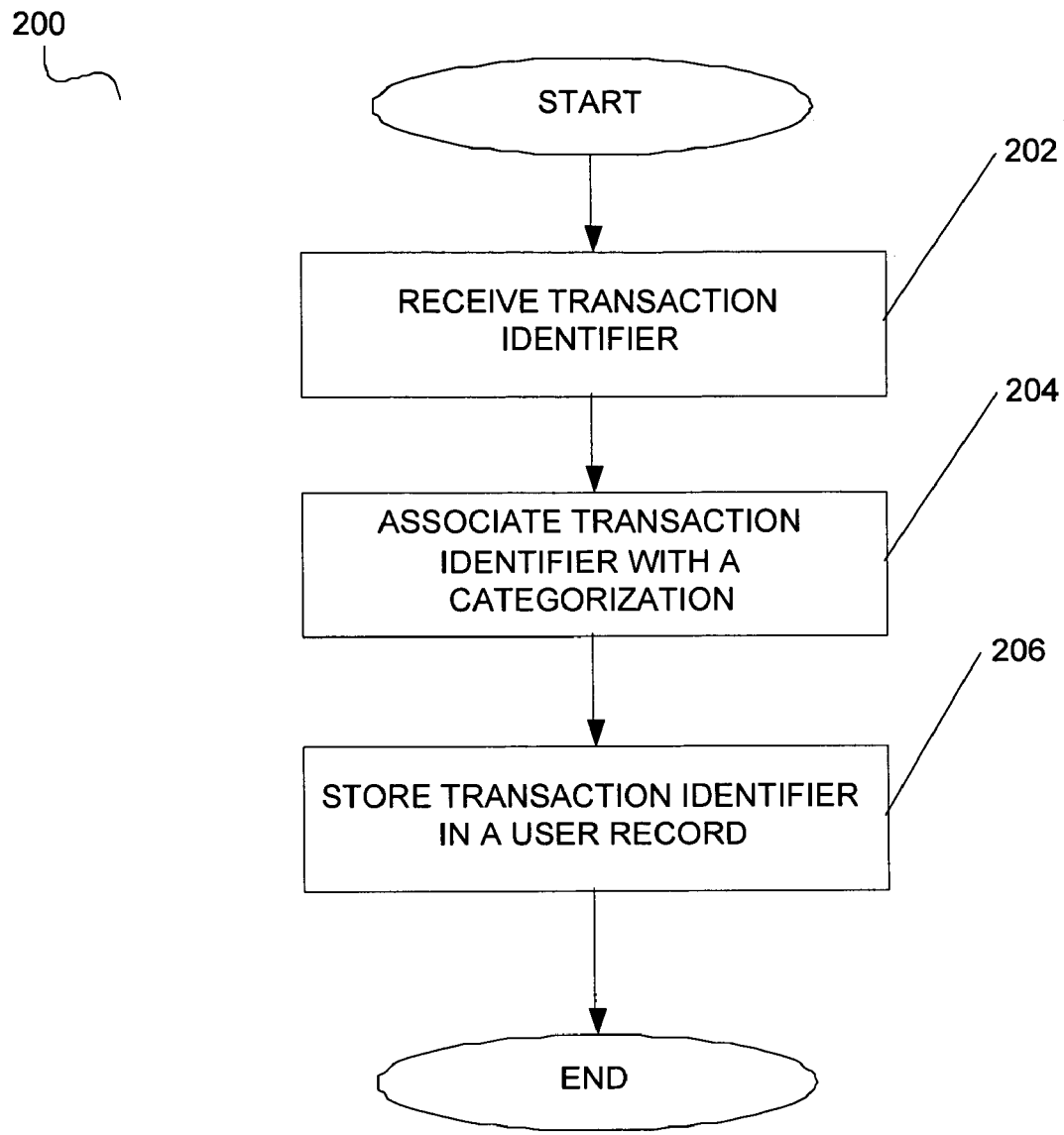
FIG. 2 illustrates a flowchart of a process of registering a transaction identifier.

FIG. 2 illustrates a flowchart of a process of registering a transaction identifier. Users may register a transaction identifier at any AS 106 in the system. Transaction identifier registration may occur during user enrollment in BAS 100 or subsequent to enrollment. If AS 106 is a point of sale, the user may register a transaction identifier during a transaction. The use of the term "point of sale" should not be considered limiting, as the present invention may be used in a variety of environments, such as a retail setting, a bank counter, or the like. Alternatively, the user may register a transaction identifier at another AS 106 prior or subsequent to a transaction. For example, a user may access BAS 100 via a personal computer connected to the Internet from his home and register various transaction identifiers.

At step 202, the system receives a transaction identifier from the user. In various embodiments, the transaction identifier may be based on biometric or non-biometric data. As such, the transaction identifier may be supplied through various input devices known in the art, such as a keyboard, keypad, BID or the like. In one scenario, BAS 100 may prompt the user for a particular transaction identifier. In another scenario, the user may be able to determine the transaction identifier to register. For example, the user could choose to register biometric data from any particular finger or could choose to register a particular alphanumeric code.

At step 204, the provided transaction identifier is associated with a category. The particular categories employed may be dependent upon system implementation. In one scenario, BAS 100 presents a variety of categories from which the user may choose. In another scenario, the user may specify the category. Categories may pertain to a particular type of transaction, such as business, personal, gift, taxable, nontaxable, or the like. Likewise, a category may designate a user. For example, to track employee spending, the transaction identifier may be a particular employee's voiceprint or other biometric. In one embodiment, a transaction identifier may be associated with a financial account. In a further embodiment, the transaction identifier may designate a category and a financial account, or, alternatively, the user may differentiate transactions by the account employed.

A user may register separate transaction identifiers for numerous categories. For example, a user may associate a separate category with multiple fingers, e.g., the index finger may indicate a personal transaction and the middle finger may indicate a business transaction. In one scenario, a user may register multiple transaction identifiers to categorize transactions in a stepped process. For example, a user may register a transaction identifier for business transactions and then register more transaction identifiers to specify the type of business transaction. Thus, a user may create a transaction identifier hierarchy wherein a category is divided into subcategories. For example, a business category may contain subcategories such as travel, entertainment, office supplies, and the like.

At step 206, after the user has supplied the required information for transaction identifier registration, this information is stored in a user record to be used during future transactions.

Figure 3:
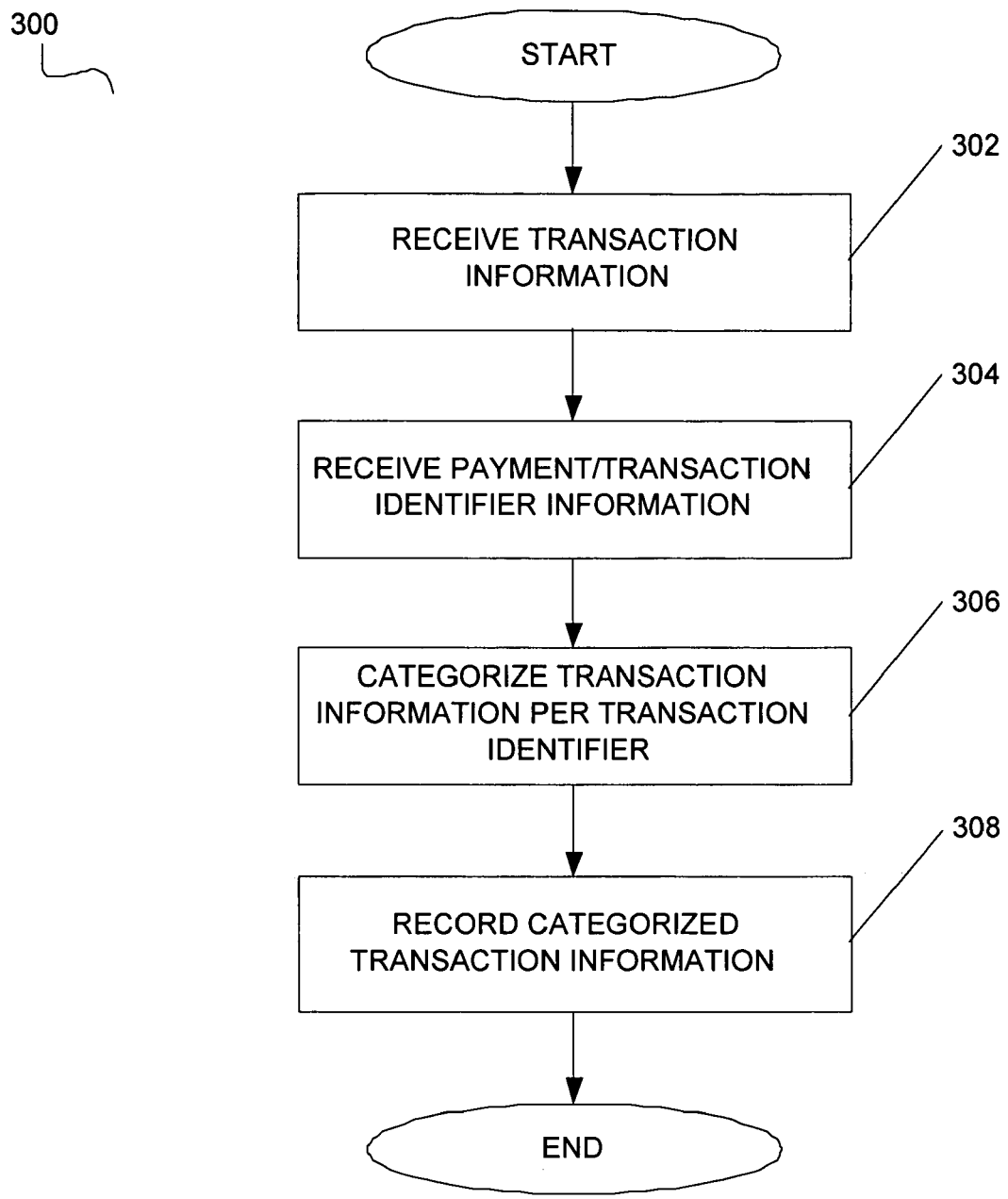
FIG. 3 illustrates a flowchart of a process of categorizing a transaction at a point of sale.

FIG. 3 illustrates a flowchart of a process of categorizing a transaction via a transaction identifier at a point of sale. For example, the user may wish to categorize a purchase or bank transaction. At step 302, BAS 100 receives transaction information from AS 106. The time of receipt of this information may vary by implementation. Transaction information may be received as a transaction transpires or at a subsequent time. For example, transaction information may be received as each item is scanned or after all items have been scanned.

If the transaction is a financial payment, such as a purchase transaction, at step 304, payment and transaction identifier information is received from the user. In various embodiments, the payment method employed may be independent of BAS 100 or may work in conjunction with it. This configuration alleviates user concern with the method of payment used as it may not have a bearing on transaction categorization. Consider first the scenario where the payment information and the transaction identifier information are distinct. In this scenario, a user may pay using cash, a bank card, a credit card, or the like and use BAS 100 to categorize transactions. If payment has been processed before categorization, payment information may be transmitted to database 104 in conjunction with transaction information. Regardless of whether BAS 100 runs independently from financial processes or in conjunction with them, payment information may be included as part of the transaction information to be categorized.

Also at step 304, BAS 100 obtains a transaction identifier. In one embodiment, the biometric data itself represents the transaction identifier. In another embodiment, the transaction identifier is distinct from the biometric data that is used in the authorization process. For example, after a user is authorized using the provided biometric data, a display at AS 106 would list numerous categories from which the user may choose. For example, a menu on AS 106 may present the various categories associated with the user record, wherein all categories may be listed on the display at once or are available through a series of screens. In general, the user may provide a transaction identifier to AS 106 upon his own volition or may be prompted for a transaction identifier by the system. In one embodiment, the transaction identifier could be provided through alphanumeric input provided at AS 106

As noted, the payment information and the transaction identifier information can be distinct. In an alternative embodiment, BAS 100 employs user biometric data to categorize the transaction and authorize a financial payment. In other words, BAS 100 may employ user biometric data to both identify the user and to identify a transaction. If the user record contains multiple financial accounts, the user may also provide a financial account identifier, such as a code, a token, or the like, to identify the account to be used for payment.

The user record associated with the user would be located for transaction categorization purposes. In one embodiment, a user's biometric data may be compared to biometric data stored in database 104 to determine the appropriate user record. As mentioned above, a user identifier, such as an SID, may assist with locating the user record. Alternatively, a user may only provide a user identifier in order to designate his user record. In addition to an SID, a user identifier may be a token, such as a loyalty card, or another type of identification.

As noted, the user may provide a transaction identifier to AS 106 upon his own volition or may be prompted for a transaction identifier by the system. In one scenario, the categorization function of BAS 100 is always active. Alternatively, the user may decide whether to employ the categorization function. For example, a user may select an option at AS 106 to activate or deactivate the transaction categorization feature. In the case of system prompting, BAS 100 may prompt the user for a transaction identifier as determined by established system parameters. System parameters may be configured to request a transaction identifier at all transactions or only at particular ones. For example, if the transaction information is travel-related, the system may request a transaction identifier to categorize the transaction as business or personal. In another scenario, a particular operator may always request transaction identifiers. For example, an operator may collect categorization data for market research purposes. A user may establish system parameters to configure the system to prompt for transaction identifiers. This scenario may be useful for a user who desires to be reminded to categorize transactions.

Alternatively, BAS 100 may automatically obtain a transaction identifier from a user record. Such an automatic process may be triggered by a variety of situations. The system may categorize transactions automatically based on the received transaction information, operator information, such as an operator identification code, or other such data. For example, transaction information containing the Standard Industrial Classification (SIC) code "5541—Gasoline Stations" may be automatically categorized as business. In another scenario, BAS 100 may automatically categorize an independent contractor's purchases from Home Depot as business transactions. Additionally, the system may employ a user's transaction history to ascertain a user's categorization behavior and categorize transactions appropriately. For example, a user's transaction history may demonstrate that the user always categorizes Best Buy purchases as personal, thus BAS 100 may automatically categorize such transactions as personal, alleviating the need for the user to supply a transaction identifier. If BAS 100 automatically categorizes transactions, the user may be able to override the automatic process at AS 106. The user may have to perform a particular action, such as pushing a "Cancel" button, or BAS 100 may inform the user before the automatic categorization. For example, AS 106 may display a message such as "This transaction will be categorized as business. If you wish to change the categorization, please place your finger on the scanner." Moreover, a user may be able to change the categorization after the transaction by accessing his user record, as will be described below.

Depending upon the implementation of AS 106, the user may be able to enter notes regarding a particular transaction or item in addition to providing a transaction identifier. For example, AS 106 may include a keyboard that allows the user to enter information into a "notes" field, such as "business dinner with CEO of BioPay; discussed expansion possibilities" or "bought paper to replenish office supply cabinet."

At step 306, the system employs the received transaction identifier to categorize the transaction information. In one embodiment, the user may provide multiple transaction identifiers to categorize a transaction more fully. For example, the system may receive iris data from a user's right eye, indicating that the transaction is to be categorized as personal. If the user's record indicates subcategories for personal transactions, the user may provide another identifier, such as a fingerprint to indicate further classification, such as groceries. In one scenario, after receiving a transaction identifier, a display at AS 106 may list numerous subcategories from which the user may choose. To select a subcategory, a user may present another transaction identifier or select an option on the display.

At step 308, once transaction information has been classified, the categorized data is recorded. In one embodiment, the categorized data is included within a sales record that is associated with a user record. Further, the categorized transaction information may be recorded on a sales receipt at AS 106. In one scenario, the transaction identifier solely designates a category to be printed on sales receipts. Alternatively, the user may receive a categorized sales receipt in electronic format. For example, the sales receipt may be delivered to the user via email or may be accessible via a website. Alternatively, a categorized itemization of a transaction may appear on the user's financial account statement.

In one embodiment, AS 106 displays a running total of categorized transaction information. This information may pertain only to the current transaction or to other transactions associated with the user record. For example, the display may list the particular number of transactions or dollar amount for one category. The running total information might also contain data regarding the time period of the categorized information. For example, the display may state that the user has made twenty business transactions in the last month.

In an alternate embodiment, a transaction identifier may be non-biometric data, such as alphanumeric data, token data, or the like. In one scenario, BAS 100 may allow a user to employ a combination of biometric and non-biometric transaction identifiers. A non-biometric transaction identifier may be used if biometric authorization is unavailable, either due to a system malfunction, lack of a BID, a user having nonviable biometric data, or the like. A user may register both biometric data and non-biometric data for a particular transaction category. In order to accommodate non-biometric identifiers, AS 106 may be equipped with a keyboard, keypad, token reader, or the like.

A non-biometric transaction identifier may be unique to the user or may be a generic code. For example, a system employing generic codes may allow all users to employ "B" for business transactions and "P" for personal transactions. In a system using unique codes, the transaction identifier may be, for example, an employee number and be used to track employee spending. As with biometric transaction identifiers, a non-biometric transaction identifier may be compared to data stored in database 104 in order to identify the appropriate user record. A user identifier, such as an SID, may assist in user identification.

As with the biometric embodiment, a user may provide additional non-biometric transaction identifiers in order to categorize transaction information further into subcategories. For example, a user may enter "P" for personal, and then "013" for grocery purchases. In one scenario, the user may provide a combination of biometric and non-biometric transaction identifiers. For example, the user may present his fingerprint to designate a purchase as business, and then enter "001" on a keypad to categorize the purchase as travel-related.

In an additional embodiment, with regard to a purchase transaction, a user may provide multiple transaction identifiers for one transaction to designate transaction categories for each item purchased. Alternatively, a transaction identifier may be assigned to a percentage of a purchase, rather than for individual items. For example, a user may designate 60% of a purchase as personal and 40% as business. If AS 106 is a point of sale, the user may provide the appropriate transaction identifier as each item is entered. Alternatively, after all items have been entered, the system may provide the user with a list of items from which he may assign the appropriate transaction identifier.

Figure 4:
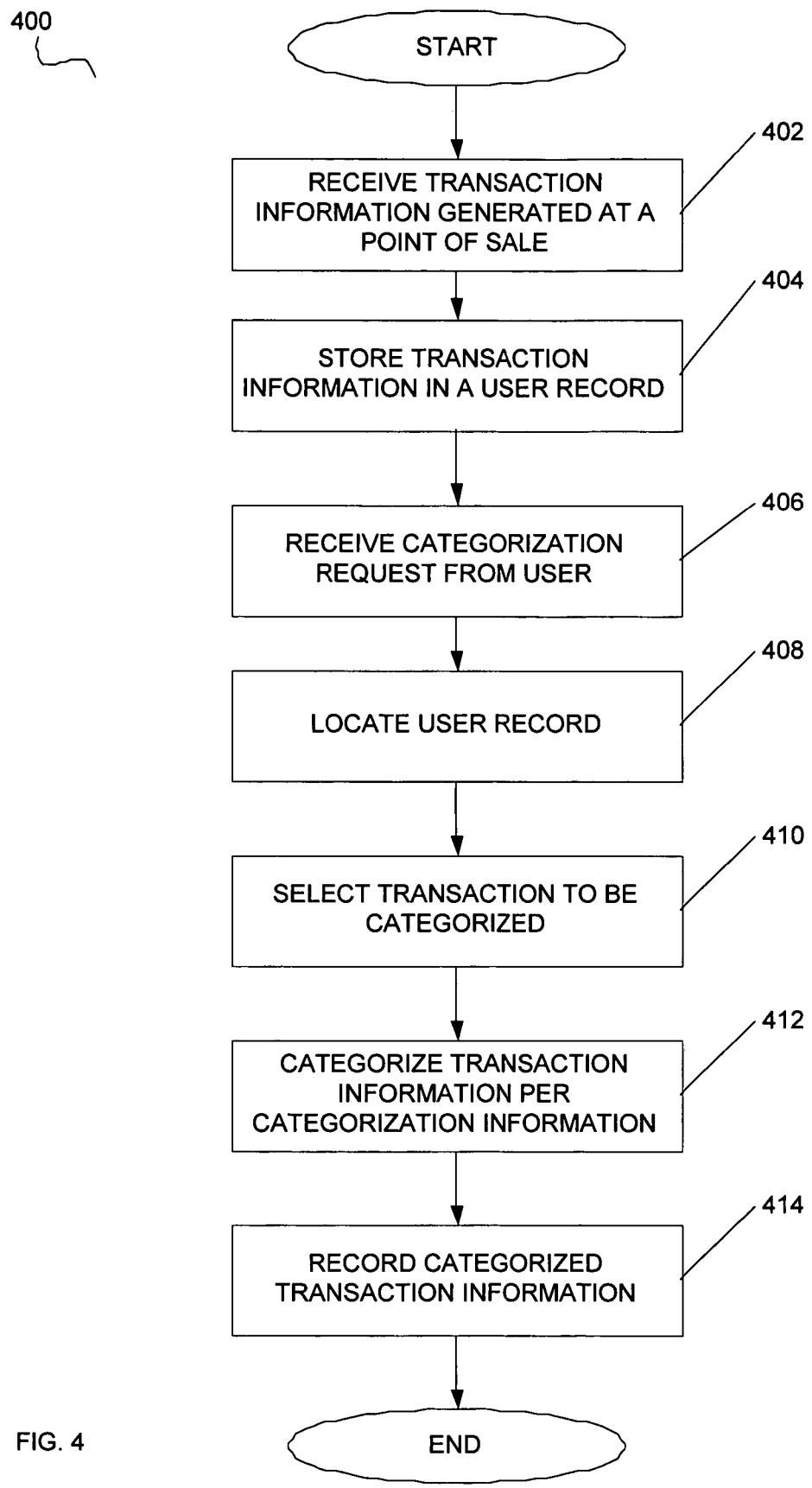
FIG. 4 illustrates a flowchart of a process of categorizing a transaction subsequent to transaction processing.

As illustrated by FIG. 4, a user may also categorize transaction information subsequent to transaction processing. For example, a user may employ AS 106, such as a personal computer, to access information from a Sam's Club transaction and categorize which particular items were business and which were personal. At step 402, database 104 receives transaction information generated at a point of sale. The time of receipt of this information may vary by implementation. For example, transaction information may be transmitted in a batch file to database 104 after an operator's business hours or may be transmitted upon transaction completion. Once received, at step 404, this information is stored in the appropriate user record. The user record may be identified by biometric data or a user identifier provided at the time of transaction.

In one embodiment, the user record employed at step 404 may be a pre-enrollment record created for a non-enrolled user. If an operator employs BAS 100 for all transactions, database 104 may receive transaction information regardless of user enrollment. The pre-enrollment record may be identified by various identifiers pertaining to the user or the transaction. For example, the pre-enrollment record may be associated with the user's credit card number or with a particular transaction number. A non-enrolled user may receive documentation informing him that he may categorize the transaction information if he so desires. For example, the user may receive a sales receipt containing instructions and an identification code to be used to gain access to the pre-enrollment record. When the user attempts to access the stored information, he may be prompted to enroll or may be allowed to conduct a categorization procedure without enrollment.

At step 406, the user requests access to his user record in order to categorize the stored transaction information. The user may make a categorization request from a variety of forms of AS 106. For example, AS 106 may be a kiosk providing access to a user record and the transaction information contained therein. In another illustration, AS 106 may be a user's personal computer connected to network 102.

At step 408, the user record is located. A user may provide biometric data to BAS 100 that is compared to biometric data stored in database 104 and a successful match would indicate the appropriate user record. As mentioned above, a user identifier, such as an SID, may assist with locating the user record. For example, a user may provide a user identifier and biometric data or a user identifier and a pass code to access his user record. In one scenario, a transaction identifier may identify a user and assist in locating a user record. A non-enrolled user may provide various identifiers associated with the pre-enrollment record, such as a credit card number, a transaction number, an access code, or the like.

Once a user record is accessed, a listing of one or more transactions to be categorized can be generated. In various embodiments, this listing can represent a specific transaction identified by a transaction number, the most recent transactions, uncategorized transactions, or the like. At step 410, one or more transactions are selected from the listing for categorization. Once the transaction(s) has been selected, the user can then provide categorization information for those transaction(s). In an embodiment that uses an online user interface, the categorization information can be selected through list menus that contain standard and customized transaction categories. In one scenario, the user may alter the categorization of transaction information that has been previously categorized. The previous categorization may have occurred at a point of sale or subsequent to transaction processing. For example, the user may have categorized a transaction erroneously at a point of sale and wish to change the categorization.

At step 412, BAS 100 employs the received categorization information to categorize the transaction information. In one embodiment, the user may provide multiple pieces of categorization information to categorize a transaction more fully. Categorization information may be a transaction identifier or the user may select a transaction category directly. For example, a display at AS 106 may allow the user to place a check next to all transactions that the user wishes to categorize as business. At step 414, once transaction information has been categorized, the categorized information is recorded.

After transaction information has been categorized and recorded, either during the transaction or at a time subsequent, it may be stored in a user record at database 104 to be reviewed and manipulated by the user, such as printing various financial reports. For example, the user may access a system website and designate categories, sort the transactions accordingly, and print expense reports. Alternatively, the user may save such reports in a variety of formats (e.g., such as an Excel spreadsheet). The user may also configure the system to send financial reports on a periodic basis. For example, the user may configure the system to transmit a monthly business expense report to the user or to another entity, such as the user's employer, an accounting entity, a tax preparation organization, a tax collection organization, an authorized user, or a financial advisor. Alternatively, a financial report may be generated and transmitted automatically if the user provides a particular transaction identifier when categorizing transaction information. If the transaction identifier designates a user (e.g., an employee number), the transaction identifier may specify the relevant user. Moreover, a user's biometric data may be associated with a financial report, thereby providing the user's certification that the transaction information thereon is appropriately categorized. For example, a user may associate his biometric data with a business expense report sent to the Internal Revenue Service, thereby stating that all transactions on the report are legitimate business expenses.

The system might also provide users with a reimbursement feature in which financial reports are sent to a specific operator. In one scenario, the operator may be the user's employer or an accounting entity. After a period of time and/or a certain amount of transactions, the system might automatically present categorized transaction information to an operator for reimbursement processing. This may be an automatic procedure or may be conducted by a user or an operator. A reimbursement request and accompanying transaction information might be submitted via email, mail, fax, or the like. The operator may have the option to approve or deny reimbursement for a transaction (or item). Users may be notified of the approval or denial in various ways, such as, for example, via Internet access. The operator may also view a user's transaction information user via AS 106. For example, the system may be configured to allow an operator to access to user accounts via the Internet.

In one embodiment, BAS 100 may send an electronic transmission, such as an email or text message, to users after a transaction. The electronic transaction may include transaction information and state the transaction identifier used for categorization. Alternatively, the electronic transmission may only state transaction information, such as the amount of the transaction, and request the user to categorize the transaction information. The electronic transmission may provide a categorization menu listing transaction identifiers for the user to select or may request the user categorize the transaction information via AS 106. For example, the user may receive an email requesting him to access a system website to categorize the transaction information. Once the user has categorized the transaction information, it may be stored in a user record, printed as a report, or the like. If the transaction information has already been categorized, either by the user or automatically, the electronic transmission may simply state how the transaction information was categorized. In one scenario, BAS 100 automatically categorizes transaction information after a time period has elapsed. The transmission may occur as determined by system parameters that have been established by the system and/or the user. For example, the system may only send an electronic transmission if the total amount of the transaction-exceeds a particular dollar amount.

As mentioned above, a transaction identifier may be used to identify an individual who conducted a particular transaction. In an additional embodiment, a user may authorize an individual to use a financial account associated with a transaction identifier. This may be a permanent or temporary arrangement established via AS 106. For example, an immobile user might ask a friend to buy groceries because the user cannot leave his home. Instead of sending the friend to the grocer with a blank check or credit card, the user might allow his friend to make a transaction with his financial account by providing a transaction identifier. If the friend is a user in BAS 100, the system may employ his registered biometric data for the authorization. If the friend is not a user, the friend may register in BAS 100 before conducting the transaction, or during the transaction if the user has provided BAS 100 with the information necessary to allow access to the friend. Alternatively, the user may register a non-biometric identifier for the friend to utilize. The transaction identifier might be unique to a particular transaction in order to prevent fraud and may only be active for one transaction, be limited to a particular time period, operator or person, or the like. The friend conducting the transaction would categorize the user's transaction (or particular items within the transaction) by providing the appropriate transaction identifier. The user may review the transaction information by accessing the system via AS 106.

In another scenario, the user may authorize an individual to employ a transaction identifier for a gift authorization. For example, the user may notify a friend that he has been registered for a purchase of up to $100.00 on the user's account. The gift authorization may be limited to a particular operator, or may be available for any BAS 100 operator. This arrangement may function for business transactions as well. For example, an eBay buyer may allow an eBay seller to retrieve funds for the amount of a particular purchase.

Transaction identifiers may be applied to numerous situations in which a categorized record may prove useful. Transaction identifiers may be applied when granting a user physical or virtual access. For example, a real estate agent may present a transaction identifier when accessing a lockbox so that an operator may track accesses to a particular property. A transaction identifier may be job site number, illustrating where an employee worked at a particular time. A transaction identifier may also be used for authorization purposes to demonstrate that a user has the credentials to perform a particular task. For example, a user may be able to purchase hazardous materials only if he provides a transaction identifier that certifies he is allowed to handle such material. This may reduce an operator's liability for selling such merchandise. In another scenario, the transaction identifier may provide an operator with useful data. For example, a user may enter a transaction identifier at a point of sale in order to purchase construction supplies. The transaction identifier may inform the operator whether the purchase was made by a contractor or not, allowing the operator to track the amount of transactions that are conducted for business and personal purposes. Transaction identifiers may categorize a variety of authorizations in which tracking the authorization category or user may be useful.

A system and method of categorizing transaction information via transaction identifiers has been illustrated. It will be appreciated by those skilled in the art that the system and method of the present invention can be used to categorize and manipulate transaction information. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. In addition, it is to be understood that the phraseology and terminology employed herein are for the purposes of description and should not be regarded as limiting.

What is claimed is:

1. A method for categorizing a financial transaction in a biometric authorization system, said method comprising:

receiving a request for access to a user record that includes information on a plurality of financial transactions completed prior to said accessing, wherein at least one of said plurality of financial transactions has associated therewith a transaction category that was determined based on biometric data that was received at a point of sale;

receiving a transaction identifier that is associated with a transaction category;

categorizing a selected one of said plurality of financial transactions in accordance with said transaction identifier;

receiving an additional transaction identifier, wherein said additional transaction identifier further categorizes the selected financial transaction in a subcategory; and saving said categorized financial transaction in said user record.

2. The method of claim 1, further comprising transmitting a prompt for said transaction identifier.

3. The method of claim 1, further comprising receiving one or more additional transaction identifiers, wherein said additional transaction identifiers are associated with different transaction categories.

4. The method of claim 1, wherein said categorizing comprises employing a transaction identifier to categorize an individual item of one or more items identified by financial transaction information.

* * * * *